May 27, 1924.

D. J. STRICKLAND

DIE FOR BRICKMAKING MACHINES

Filed Jan. 26, 1922

1,495,235

Inventor
D. J. Strickland
By Hull Brock & West
Attys.

Patented May 27, 1924.

1,495,235

UNITED STATES PATENT OFFICE.

DAVID J. STRICKLAND, OF CLEVELAND, OHIO.

DIE FOR BRICKMAKING MACHINES.

Application filed January 26, 1922. Serial No. 531,840.

*To all whom it may concern:*

Be it known that I, DAVID J. STRICKLAND, a citizen of the United States, residing at Cleveland, in the county of Cuyahoga and State of Ohio, have invented a certain new and useful Improvement in Dies for Brickmaking Machines, of which the following is a full, clear, and exact description, reference being had to the accompanying drawings.

This invention relates generally to brick machines of that class in which the clay is forced through a die into the mold and the invention has particular relation to a novel device for stripping or trimming off the surplus clay as the mold is forced from beneath the die. The object of the invention is to provide a simple and efficient device which can be quickly and easily removed and replaced when worn. With this object in view the invention consists in the novel features of construction hereinafter fully described and pointed out in the claims.

Figure 1:
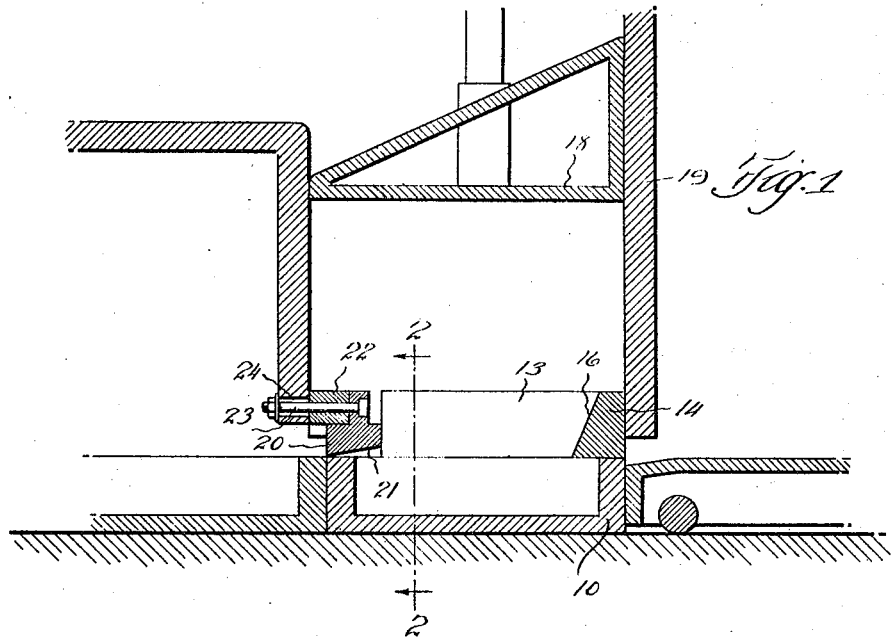
Figure 2:
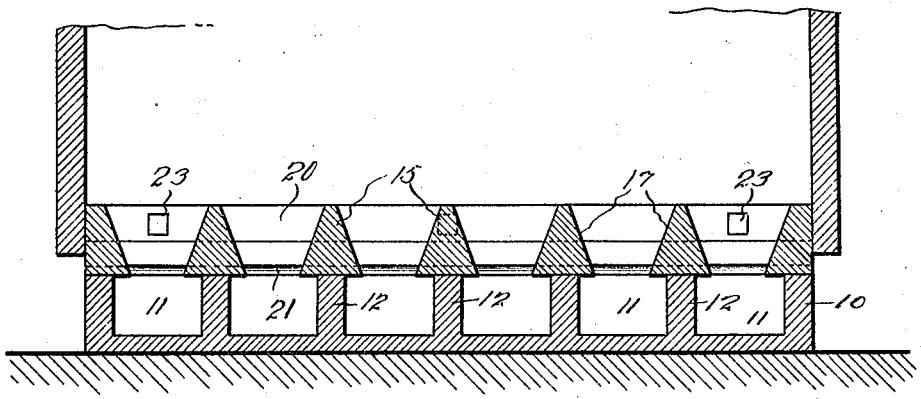

In the drawing forming a part of this specification, Fig. 1 is a vertical sectional view of a mold, die and the delivery chute of a pug mill and the plunger therein; Fig. 2 is a section on the line 2—2 of Fig. 1 looking in the direction of the arrow.

In carrying out my invention I employ a multiple mold 10 divided into a series of separate mold compartments 11 by means of the partitions 12, this being the usual type of mold commonly employed in this class of brick making machines. The die 13 is of the open face type and comprises a rear portion 14 and a series of dividing partitions 15, the face of the rear portion 14 being inclined as shown at 16 and the faces of the partitions 15 are also inclined as shown at 17 providing contracted orifices which communicate with the mold compartments 11 and it will be noted that the partitions 15 register with the partitions 12 and that the bases of the partitions 17 are somewhat wider than the thickness of the partitions 12, as it has been found that this construction is preferable as the clay is forced through the contracted openings of the die and then expands in the mold compartment. The mold 10 is shoved in the direction of the arrow after it has been filled by the plunger 18 descending in the delivery chute 19 of the pug mill so as to force the clay through the die into the mold and in order to strip or trim off the surplus clay I provide a trimming bar 20 which has its lower edge beveled as shown at 21 and which rests upon the forward edge of the mold as shown in Fig. 1. As the mold is forced forwardly, this trimming bar 20 will serve to trim off or smooth down the clay level with the top of the mold, thereby providing a smooth and compacted upper surface for the clay in each of the mold compartments. The trimming bar 20 is rigidly attached to a transverse bar 22 which is connected to the forward side of the delivery chute by means of bolts 23 which pass through the trimming bar and transverse bar as shown and the openings 24 through which the bolts 23 pass are elongated vertically as shown so that the transverse bar and trimmer bar connected thereto can have a limited vertical movement thereby preventing breakage in case any unyielding obstruction should be encountered as the mold is being forced beneath the trimming bar.

In practice I prefer to make the transverse bar 22 substantially rectangular in cross section as shown and construct the trimming bar with a rabbet upon the forward face thereof so as to receive this transverse bar 22; and by means of this construction I am able to securely unite the transverse bar to the trimming bar and avoid any lost motion between these parts. The underface of the trimming bar being beveled or inclined as shown, greatly facilitates in the operation of the device, rendering the same easier and gradually compacting and trimming the clay from the top of the mold as the said mold is moved forwardly.

Having thus described my invention, what I claim is:—

1. In a device of the kind described, the combination with a delivery chute having a die at its lower end, of a trimming bar arranged at the lower end of the delivery chute and forward of the die, and within the delivery chute, said trimming bar having a beveled lower face, said bar having a limited vertical movement with respect to the die.

2. In a device of the kind described, the combination with a delivery chute of a pug mill, of a die arranged at the lower end thereof, a transverse bar attached to the lower end of the delivery chute upon the interior thereof, a trimming bar attached to the transverse bar in advance of the die and having a beveled lower face, said transverse bar and trimming bar having a limited vertical movement with reference to the die.

In testimony whereof, I hereunto affix my signature.

DAVID J. STRICKLAND.